United States Patent [19]

Ackeret

[11] Patent Number: 4,784,556
[45] Date of Patent: Nov. 15, 1988

[54] DEVICE FOR THE REARRANGEMENT OF A PILE OF PICTURES

[75] Inventor: Peter Ackeret, Kusnacht, Switzerland

[73] Assignee: Licinvest AG, Chur, Switzerland

[21] Appl. No.: 888,327

[22] PCT Filed: Nov. 12, 1985

[86] PCT No.: PCT/EP85/00616
§ 371 Date: Jul. 11, 1986
§ 102(e) Date: Jul. 11, 1986

[87] PCT Pub. No.: WO86/03030
PCT Pub. Date: May 22, 1986

[30] Foreign Application Priority Data

Nov. 13, 1984 [DE] Fed. Rep. of Germany ....... 3441463

[51] Int. Cl.⁴ .............................................. G09F 11/30
[52] U.S. Cl. ........................................ 414/37; 40/511; 40/513; 221/245; 271/3.1
[58] Field of Search .................. 40/490, 511, 513; 221/151, 152, 197, 220, 239, 245, 246, 312 C; 414/37; 271/3.1

[56] References Cited

U.S. PATENT DOCUMENTS 4,376,348 3/1983 Ackeret .................................. 40/513
4,458,434 7/1984 Ackeret .................................. 40/513

FOREIGN PATENT DOCUMENTS 2454112 7/1980 France .

OTHER PUBLICATIONS

S. Hildebrand, *Feinmechanische Bauelemente*, 1978, pp. 579–581, 593–595 (with translation).

*Primary Examiner*—Robert J. Spar
*Assistant Examiner*—Janice Krizek
*Attorney, Agent, or Firm*—Jeffery H. Ingerman

[57] ABSTRACT

The invention relates to a device for the cyclic rearrangement of a pile of rectangular or square pictures, with a first and a second frame part (12, 14), which can be moved back and forth parallel to the principal plane of the pile of pictures held by them, with a separator bar (20), arranged in the second frame part (14), which defines a separating through-gap for a picture and a return through-gap for the picture, with a retaining element in the first frame part (12) for retaining a picture taken from one end of the pile and guided through a separating through-gap, and with a guide element for shifting the retained picture transversely to the pile and returning it through the return through-gap to the other end of the pile, and with a viewing window (35) in one of the frame parts (12), wherein the two frame parts (12, 14) are coupled by way of a free-wheel-type device which, when the two frame parts (12, 14) are in the end position where they are pulled completely apart, frees the return movement and, in the end position where they are pushed completely together, frees the withdrawal movement, but when there is a change in the direction of movement blocks this at least in the two respective areas of reversal of withdrawal and return movement adjacent the two end positions.

31 Claims, 6 Drawing Sheets

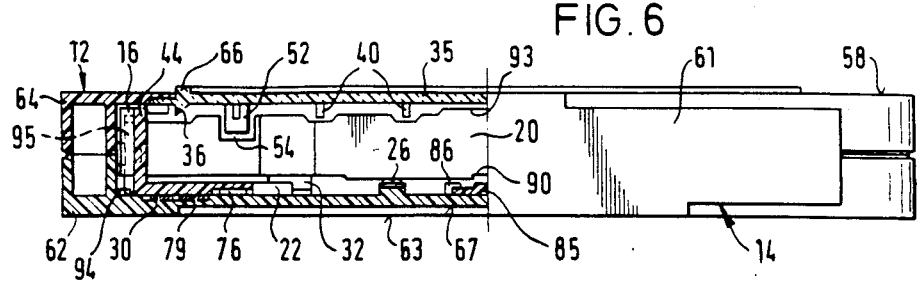
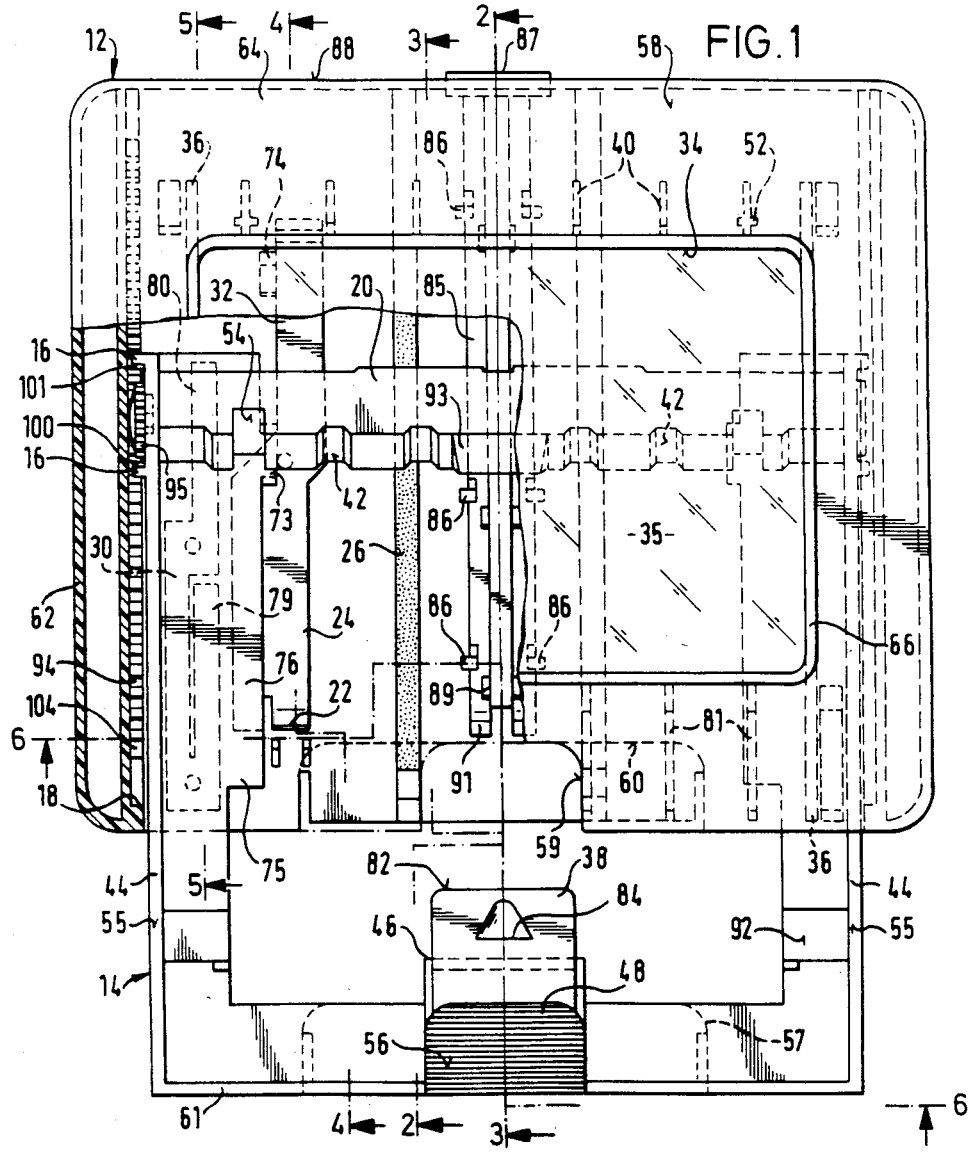

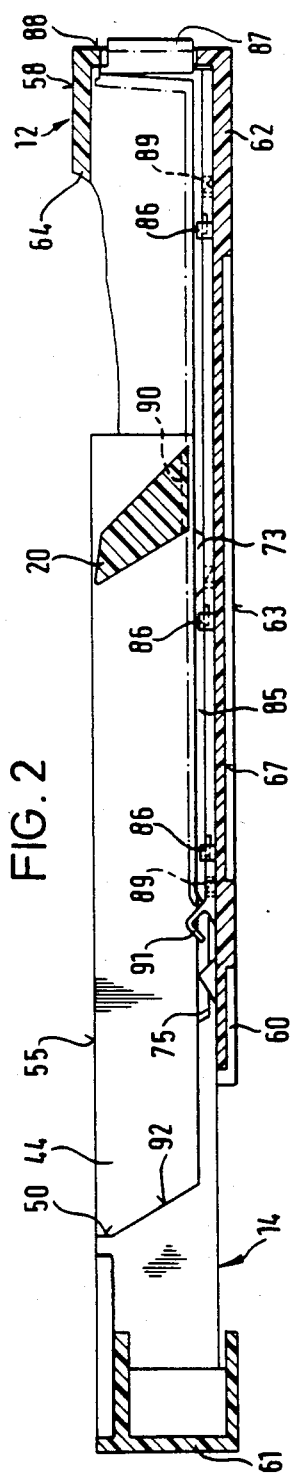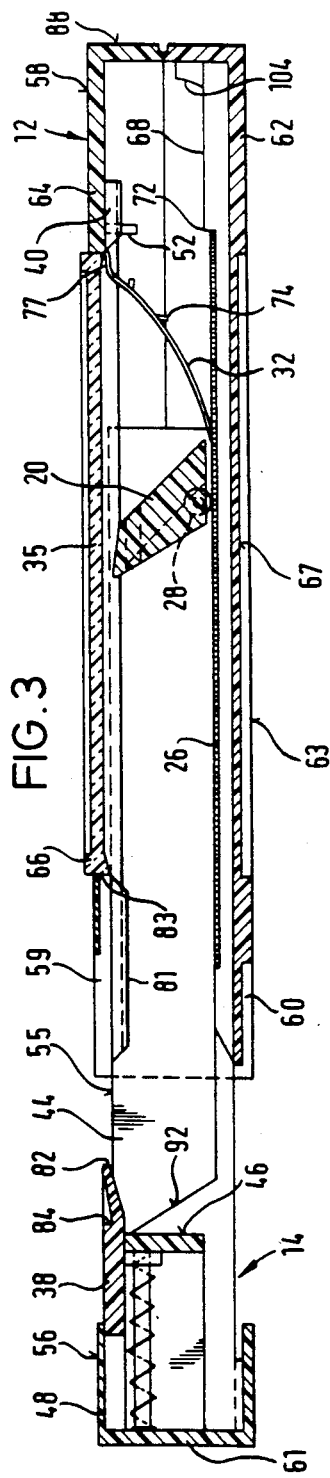

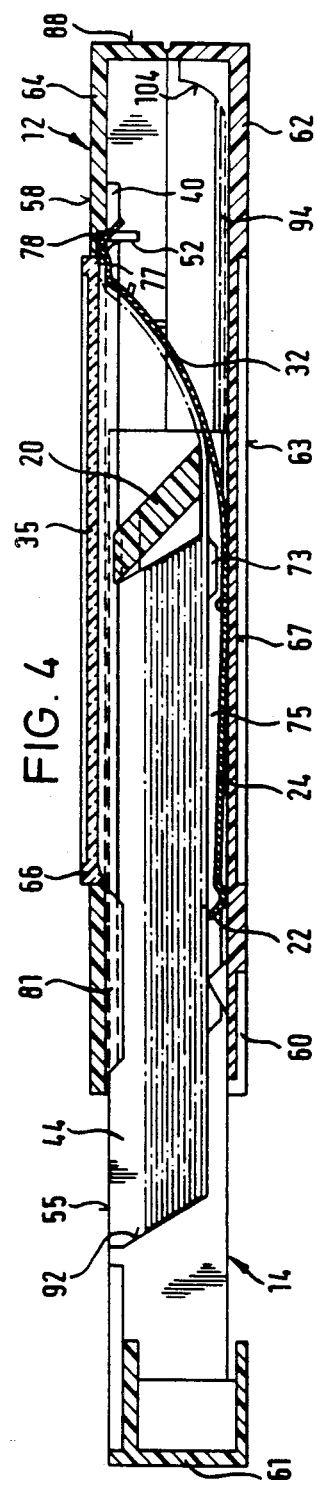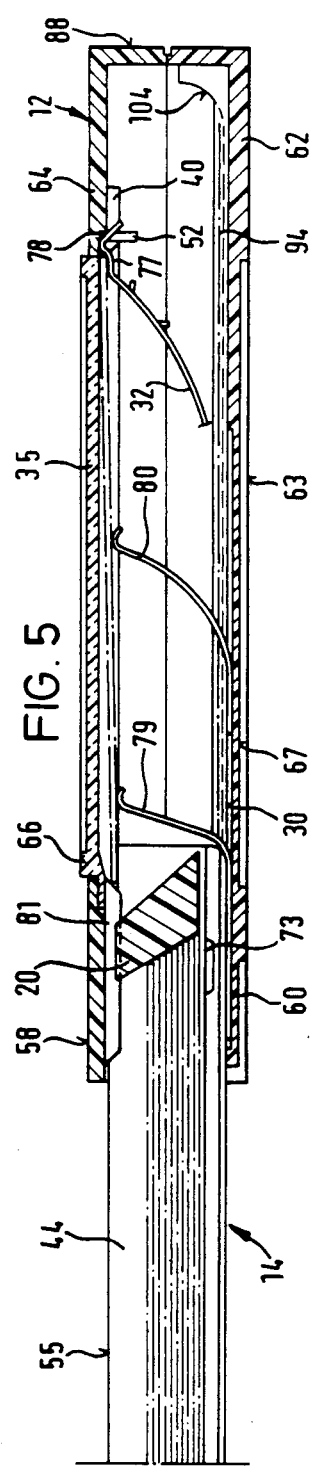

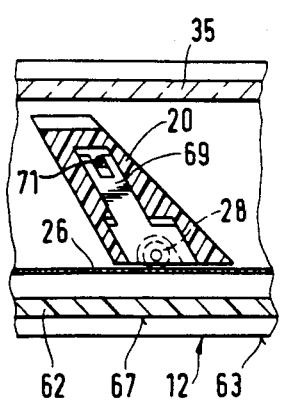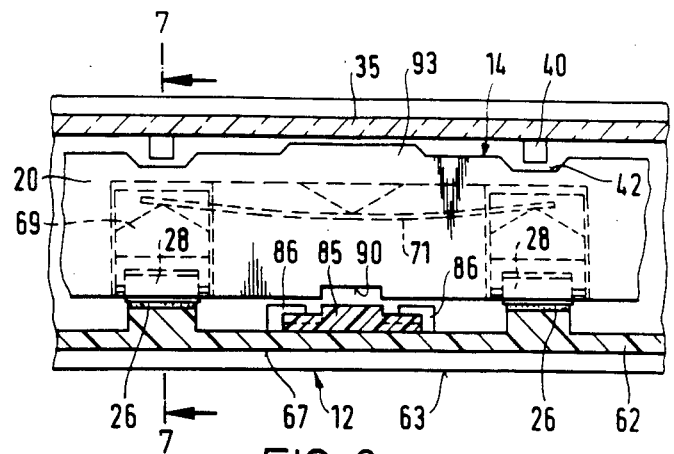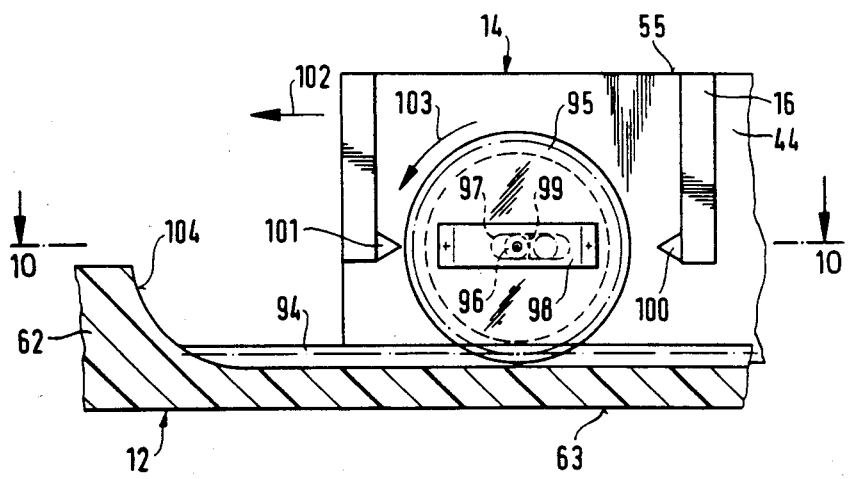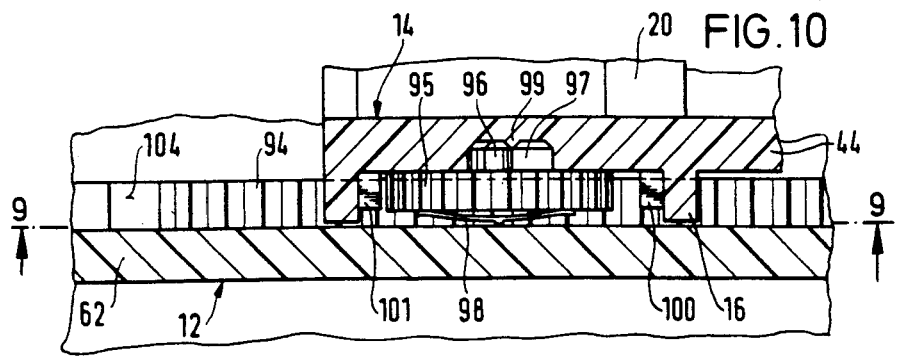

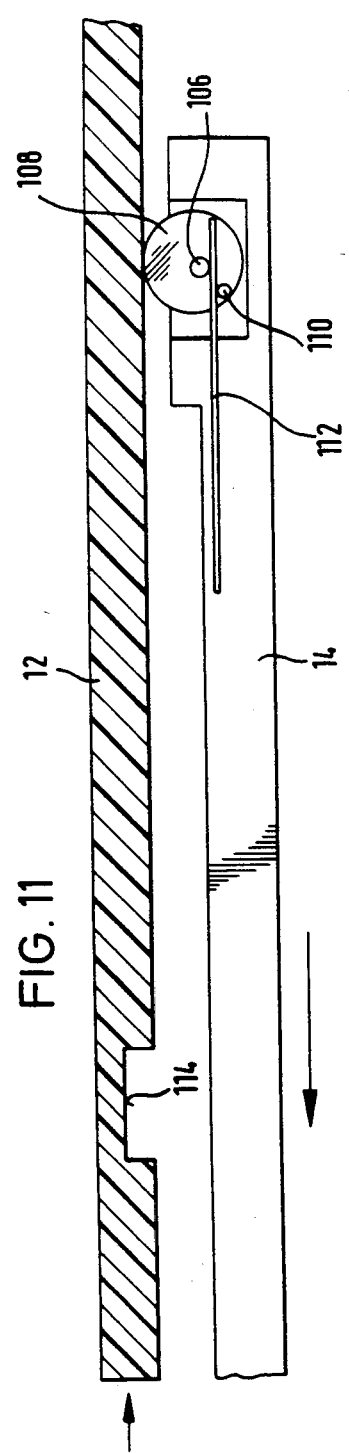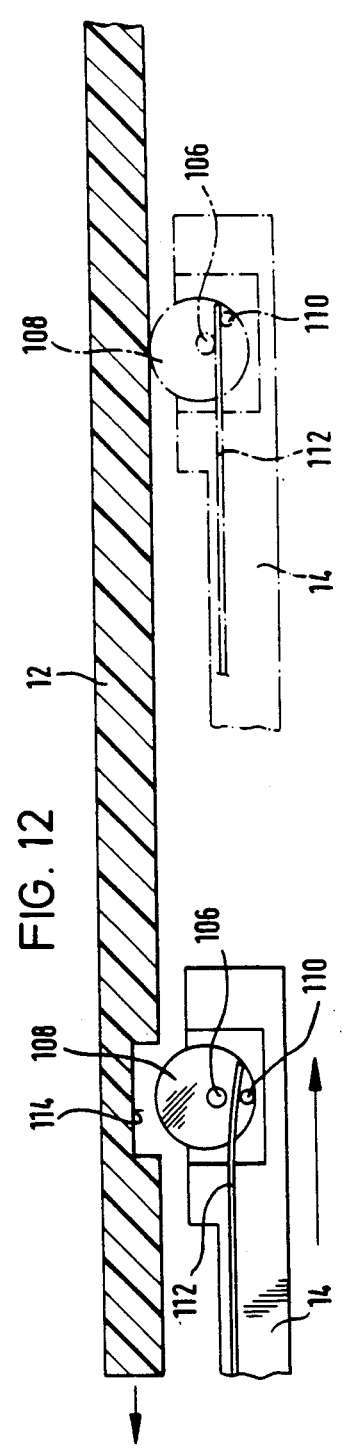

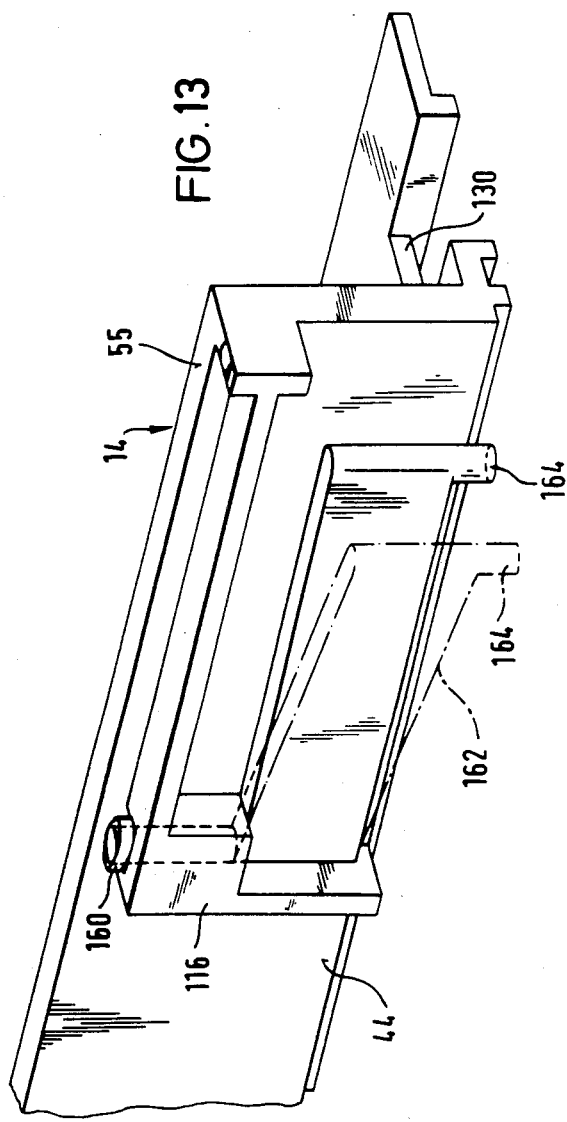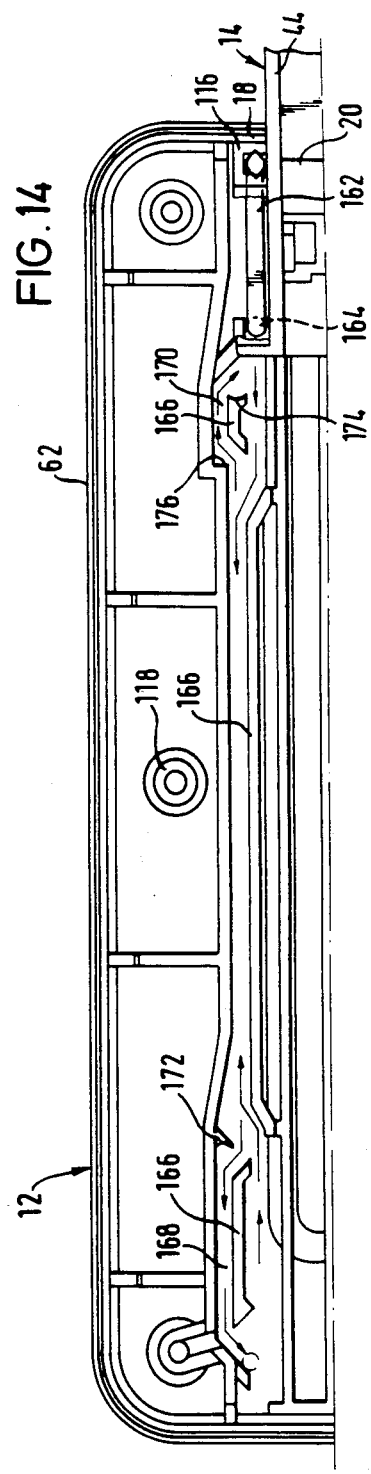

DEVICE FOR THE REARRANGEMENT OF A PILE OF PICTURES

The invention relates to a device for the cyclic rearrangement of a pile of rectangular or square pictures, or a so-called "picture-changer".

Picture changers are known from U.S. Pat. Nos. 4,238,898, 4,238,899, 4,241,528, 4,241,529, 4,245,417, 4,259,802 and 4,376,348. These patents are all based on the principle that a pile of pictures, especially photographic prints, is held by two frame parts that are movable relative to one another, one of which has a viewing window. During each complete cycle of movement of the frame parts (for instance in the form of a housing and a slider member), that is, pulling them fully away from each other and pushing them fully back together again, one picture is removed from one end of the pile and returned to the other end of the pile again. The picture changers have the following components for this:

A feeding means which feeds pictures to the separating means;

a separating means which detaches a single picture from the pile;

a retaining means which holds the individual picture separated from the pile in one of the frame parts whilst the remainder of the pile is held in the other frame part;

a guide means which guides the separated individual picture in such a manner that it passes to the other end of the remainder of the pile.

If a picture changer of this type is used for photographic prints, then problems arise as a result of the specific properties of the pictures, which are very thin (of the order of 0.25 mm). They consist of a layered construction of paper and plastics. The result of this is that with changing environmental conditions the pictures become unforeseeably warped and bowed. In addition they tend, as a result of moisture or static charge, to stick together.

During the changeover operation, the cyclic rearrangement of the pile of pictures, if the changeover operation is interrupted for any reason and the user pushes the slider member, when it has been only partially withdrawn, back into the housing, four critical situations arise:

The first critical situation arises if the rear edge (in the direction of movement) of the picture to be rearranged is about to emerge from a separating gap for separating the picture from the remainder of the pile. The guide means has at that point not yet begun to displace this edge transversely to the separator bar, but a part of this edge is already beyond the bar whilst another still lies beneath it (if, for instance, the picture edge in question does not run exactly parallel to the separator bar). This is shortly before the outer end position. If, then, the slider member, instead of being pulled right out is pushed back in, the edge of the picture strikes the separator bar and is buckled, so that the picture can neither be guided back under, nor back over, the pile.

The second critical situation arises shortly before the inner end position is reached. The rear edge (in the direction of movement) of the picture is then still located in the return through-gap whilst the next changeover operation is already being prepared for. Here, too, there is the possibility that the picture might become buckled.

The third critical situation arises if, during the first phase, the withdrawal of the slider member, a part of the separated picture still remains in the separating gap but the next picture in the pile has already been detached and is "waiting" with its leading edge in front of the inlet of the separating gap. If the frame parts are then pushed together the opposite-lying edges of the two pictures strike one another and result in buckling.

The fourth critical situation arises if, during the second phase, the operation of insertion of the slider member, operation is interrupted and the slider member is moved back and forth several times by short amounts. The risk here is that the rear "pushed" edge of the individual picture swings loose from the "pushing" component, the picture changer becoming inoperable.

The problem of the invention is therefore to provide a device for the cyclic rearrangement of a pile of pictures in which the risk of the pictures in the pile being buckled in the manners described above is excluded, so that trouble-free picture-changing is ensured.

This problem is solved by a correspondingly designed free-wheel-type device which blocks a change in the direction of movement of the slider member at least in the critical areas.

Further developments of the invention are disclosed in the following description and in the claims.

The invention is explained in detail hereinafter by way of examples of execution illustrated in the accompanying drawings.

FIG. 1 shows in plan view and partially cut away a picture changer with a partially withdrawn slider member.

FIGS. 2 to 10 show sections and details of the picture changer of FIG. 1.

FIGS. 11 and 12 show a further embodiment of a device preventing maloperation of the picture changer.

FIGS. 13 and 14 show an additional embodiment of a device preventing maloperation of the picture changer.

In the example of execution shown in FIGS. 1 to 10, a first frame part is designed as a housing 12, and the second frame part is a slider member 14 which can be pulled out of the housing for a distance limited by stop members 16 on the slider member and complementary stop members 18 on the housing and pushed back in again. The separating means is formed by a separator bar 20. The feeding means is embodied by hook-like members 22 which are located on leaf-spring type spring arms 24. The retaining means for holding the remainder of the pile in the slider member is likewise formed by the separator bar, whilst the separated individual picture is held in the housing by the co-operation of rails, arranged fixedly in the housing and provided with a retentive coating 26, with rollers 28 that hold the individual picture firmly against the rails and are caused to rotate as a result of contact with the rails. Finally, the guide means is embodied by pairs of leaf springs 30 and spring arms 32, the spring arms 32 being formed integrally with the spring arms 24.

In the inserted state of the slider member 14, the spring arms 24 and 32 press the pile of sheets (not shown in FIG. 1) against a viewing window, the inner border of which is denoted by 34. The picture which is then uppermost in the pile, in a specific case a photographic print, is intended to lie as flat as possible; to that end, at its periphery it is supported in a plane that is defined by lateral ribs 36, by the underside of a slidable catch 38 and, at the opposite end, by ribs 40 moulded on the housing.

FIG. 1 shows the partially withdrawn position of the slider member 14. In the inserted state, the separator bar lies on the other side of these ribs 40; however, because it projects further towards the window 35 which corresponds to the height of these ribs, it has recesses 42 so that the ribs are able to pass through.

The edges of the pile are supported laterally, (that is, parallel to the withdrawal direction) by side pieces 44 of the slider member. At the front, that is, on the side of the slider member that is furthest away from the housing when the slider member is withdrawn, the edges are supported by the stop face 46 of a centrally arranged grip part 48 that the user may grip and by lateral stop faces 50 on the slider member. At the opposite end, the edges of the photographs are supported against stop members 52 moulded in the housing, for the passage of which the separator bar likewise has recesses 54 that are substantially deeper than those for the ribs 40.

The rib 36 extends further into the interior of the slider member than the height that is defined by the top edge 55 of the side pieces of the slider member so that the photographs are unable to slide out laterally over the side pieces of the slider member. An analogous action occurs between the separator bar on the one hand, the ribs 40 on the other.

The grip part 48 has a top part 56, arranged on the window side of the housing, and a bottom part 57 which is wider than the top part; the top wall 58 of the housing surrounding the window in the manner of a frame has a cut-out 59 in the region of the top part whilst the opposing housing wall is recessed at 60 in a complementary manner for the bottom part 57. Accordingly, in its closed state the device has a closed, substantially rectangular outline without any protruding parts.

The housing and the slider member are injection-moulded plastics parts. The slider member is a one-piece element, comprising side-pieces, separator bar, grip part and a front wall 61 joining the grip part to the side pieces, which are of L-shaped cross-section.

The housing is composed of three parts: the bottom shell 62 providing the base 63, the frame-like upper shell 64 with the window aperture, and the window 35 set into this. The housing is reinforced in the direction of the slider member movement in that the struts between the top and bottom wall are constructed as double supports, as shown in FIG. 6. The housing parts can be welded together, or a snap-fit connection may be provided.

Around its main surface the window has a narrow border 66 that protrudes slightly outwards, so that it is somewhat proud in respect of the frame surrounding it. A recess that is complementary with the outline of this border on the outside of the opposite bottom wall is denoted by the numeral 67 and permits several housings to be stacked one on top of the other.

When the slider member is withdrawn from the housing, it is gripped using one hand at the top and bottom parts of the grip part, whilst the other hand holds the housing. The hook-like members 22 engage the front edges of the photographs lying on the spring arm ends, that is the edges furthest away from the separator bar, as a result of which a certain number of photographs, depending on the height of the hook-like members, is fed to the separating means. This is basically formed as a through-gap which is defined, firstly by (in the example of execution) two lands 68 moulded on the base of the housing on the inside and, secondly, by the underside of shoes 69 that oppose the lands, the shoes being inserted into the separator bar and shown in FIG. 7 in section and in FIG. 8 in front view.

Each land 68 is associated with a respective shoe 69 and the land/shoe arrangements are located on both sides of the plane of symmetry of the device. The shoes are guided longitudinally in the separator bar, are supported on a knife-edge-like bearing and biassed by an inserted wire spring 71. Each shoe additionally accommodates a small roller that is rotatable about an axis at right angles to the withdrawal direction and the small roller 28 projects slightly from the shoe.

FIG. 3 shows the position of the lands 68 which protrude by fully the thickness of a photographic print further above the level of the base of the housing than the surface of the retentive coating 26. In the rest or closed position of the slider member, the lowermost portion of the shoes is spaced somewhat from the edge 72 of the land, and the surface of the separator bar facing towards the pile is sloped, somewhat like a wedge, such that, as the separator runs onto the edge of the pile, the photographs, on the opposite edge of which the hook-like members 22 are acting, "migrate" downwards along the oblique face towards the edge 72 of the lands facing them. There is sufficient room between the shoes 69 and the retentive coating 26 for the leading edge of a single photograph alone (the lowest in the pile) to be able to enter the gap forming between the shoes 69 and the retentive coatings 26, for as long as this gap is held open by the land 68 as will be explained. All the other photographs transported with the hook-like member 22 come up against the separator itself or against the shoes thereof with the result that the hook-like members slip off the extreme edge of the photographs.

When the rear edges (in the withdrawal direction) of the shoes 69 have passed the edge 72 of the lands 68, the shoes drop under the action of the wire spring 71, the rollers 28 positioning themselves on the individual photograph that has been separated in this manner and pressing it onto the associated retentive coatings so that it is firmly held in the housing, that is, the first frame part. The remainder of the pile is transported by the separator together with the slider member to the outside until the slider member has been fully withdrawn.

Care should be taken therein that the separator bar also runs over the spring arms 32. So that they do not stress the separated picture from below during the passage of their ends acting on the pile, during a certain phase of the withdrawal movement they are pressed mechanically towards the base of the housing. Spring-depresser members 73 moulded onto the slider member side pieces 44 are used for this purpose; these spring-depresser members pass over projections 74 extending laterally from the spring arms and hold the arms corresponding to their length for a part of the withdrawal movement. Further spring-depresser members 75 on the slider member side pieces run onto the spring arms 24 at the enlarged portion 76 as soon as the individual photograph has been safely held between the retentive coating and the rollers, and press these arms likewise away from the viewing window so that further photographs can be introduced and others removed without hindrance.

On the side of the separator furthest from the pile the spring arms 32 are released again after travelling a short distance so that they again act from beneath the separated photograph and guide its rear edge gradually towards the window. Finally, this edge positions itself under the influence of the springs against the upper side of the housing. Because the free ends of the spring arms are rounded, but this edge shall on the other hand be firmly held at the position it has reached, a short portion of the spring arms is additionally of linear formation, denoted by 77 in FIG. 4. The rounded spring arm end finds space in a recess on the inside of the housing top wall, denoted by 78 in FIG. 5.

The two hook-like members 22, the two shoes 69, the retentive coatings 26 and the spring arms 32 are all in each case arranged symmetrically with respect to the central plane of the device as a whole, and the two hook-like members 22 lie as exactly as possible on a line that is at right angles to this plane of symmetry. This means that the photograph to be changed then goes through the changeover operation without being rotated even when it is not guided by the slider member side pieces because it has dimensions smaller than its nominal ones. The dimensional tolerances of photographs are in fact, with the same nominal size, different in the transverse and longitudinal direction: since the processing firms work with photographic paper from rolls of very accurately defined width and then cut the photographic paper up into different lengths, it is preferable to have the closer toleranced dimension of the photograph in a direction appropriate to that in which the slider member moves.

The separated individual picture, which until now has been described as being held only at its one edge, is lifted in its entirety towards the window. For this, the leaf springs 30 already mentioned having forwardly-positioned arms 79 and rearwardly-positioned arms 80 are used, these arms holding and supporting the individual photograph, as seen clearly from FIG. 5, in such a manner that it is able to return to the pile again as the slider member is pushed back in. In the closed state of the device and during the withdrawal movement of the slider member, at least during the initial part thereof, the spring arms 79, 80 are pressed by the side pieces of the slider member into complementary grooves in the base of the housing, which may be seen in FIG. 6.

At the start of the return movement of the slider member, the individual photograph is held by the spring arms 32 in front of the stop members 52 moulded on the housing and is supported in the direction of the separator bar at four points by the spring arms 79, 80. The other transverse edge of the photograph facing towards the separator bar may hang down; the side of the separator facing it is, however, sloped, somewhat like a wedge, so that the edge is raised gradually as the separator bar runs onto it. Between the top edge of the separator bar and the top wall of the housing there is a gap which is generously dimensioned for the passage of the photograph. The risk of the photograph striking against the edges facing it of the remainder of the pile transported by the slider member is countered by the top wall of the housing having holding-down lugs 81 on its inside which hold the pile below the level of the top side of the separator. These holding-down lugs are aligned with the ribs 40 so that they pass through the complementary recesses 42, 54 of the separator bar.

The slidable catch 38 is mounted so as to slide in the grip part and is biassed by a spring towards the housing, as readily recognisable from FIG. 3. As the slider member is inserted, the free edge 82 of the slidable catch strikes against a stop member 83 provided in the housing, as a result of which the slidable catch is pushed back into the grip part and does not project into the space visible through the housing window. Once the slider member has been pulled out, however, the slidable catch prevents the photographs lying in the slider member from falling out. To change the photographs, the slidable catch can be pushed back manually, which is facilitated by the finger-engageable edge 84. The photographs may be pushed out from the underside of the slider member by getting hold of them between the side pieces, or they may be grasped from above next to the grip part.

In the case of the procedure described so far, the separated photograph always remains behind in the housing. It is not possible, or only possible with difficulty, to remove this from the device In order to be able to remove the pile even when this consists of one picture only, a special arrangement is therefore provided.

A control bar 85 is slidably mounted in the housing, held by retainers 86 moulded onto the housing. The bar carries an actuating or control key 87 which passes through the rear wall 88 of the housing and projects slightly beyond the outline of the changeover device. By applying pressure with the finger to the key, the bar runs on wedge-like guide members 89 on the base of the housing and is thereby lifted towards the window. The width of the bar fits exactly into a complementary recess 90 in the separator and blocks, for the entire withdrawal movement of the slider member, the through-gap of the separating means, so that every picture located in the device has to be transported out with the slider member. Close to the outer end position of the slider member, its separator bar runs over an upwardly-projecting part 91 of the bar which yields resiliently downwards; if the slider member is now pushed back in, the separator bar first pushes the bar back into its initial position, before it can be freely guided back with the upwardly-projecting part 91 being deflected again.

As mentioned above, the photographs are intended to be held by the means described at a distance from the window pane so that during the changeover operations it does not come into contact with the surface of the picture, causing scratch damage to occur. There is still this danger, however, because the photographs are not always flat, but generally speaking are bowed either in the longitudinal or in the transverse direction. In the case of bowing in the longitudinal direction, the ribs 36 effective for the entire withdrawal movement are sufficient. In the other case, however, the slidable catch is effective but the opposite portion of the separator bar would hardly be able to absorb the considerable stresses which occur in a relatively thick pile of similarly bowed photographs.

Beneath the stop faces 50 the front wall of the slider member therefore has, near the side pieces 44, inclined faces 92 which are substantially parallel to the separator slope lying opposite. The photographs thus lie so that they are staggered obliquely between separator and inclined faces, so that most of the stresses in the pile are distributed over the entire surface of the separator. In addition, in the center of the separator bar a projection 93 is provided which takes up the residual stress of those photographs which are supported against the stop faces 50 perpendicular to its edge.

Once the user has begun to carry out the changeover movement, this must be completed in order to bring the device back into the initial position. The slider member cannot therefore be pulled out halfway and then pushed in again.

This is effected by means of a mechanism which is shown in detail in FIGS. 9 and 10. Moulded onto the housing there is a toothed rack 94 with which a pinion 95 meshes, the pinion being integrally-formed with its shaft 96. The shaft fits in a slot 97 running parallel to the rack in the side piece 44 of the slider member, in which slot it is pressed and held by means of a small leaf spring 98, moulded onto the pinion, and resting against the housing.

The slot is divided by means of a rib 99 into two parts, in which the shaft 96 has only a little lateral play. Finally, moulded onto the slider member on both sides of the slot there are locking lugs 100, 101 which lie in the plane of the toothed circumference of the pinion and the points of the lugs are engageable with the latter.

Let it be assumed that the pinion is in the position shown in FIG. 9 and that when the slider member moves in the direction of the arrow 102 the pinion rotates in the direction of the arrow 103. Owing to the friction of the small spring 98 on the housing wall the pinion is thereby held near the center of the slot with its shaft resting against the rib 99. The result is a spacing, although this is small, between the circle defined by the tips of the teeth of the pinion and the point of the lug 101. If an attempt is now made to move the slider member in the opposite direction, the pinion is displaced to the outer end of the slot and its further movement immediately blocked by the point of the lug 101. At the end of the travel of the slider member, however, the toothed circumference of the pinion meets a stop sector 104 and, with the small spring 98 being deformed, is lifted over the rib 99, so that now rotation only in the opposite direction is enabled.

It is important to note that over the greater part of the withdrawal travel of the slider member the retaining means is indeed embodied by the rollers 28 in conjunction with the retentive coatings 26, but over the last part of the travel, shortly before the end position is reached, the spring arms 32, by firmly holding the individual photograph, also act as an "extension" of the retaining means.

As is apparent from the preceding explanation, each rearranged sheet is never released during the whole changeover cycle, but is held at at least two points and thus secured against rotation. It is thus constantly under control, in this case with means symmetrical to the axis.

The limbs of the slider member side pieces which are parallel to the pile and on which the separated sheet supports itself during rearrangement, should be at the most at such a distance from each other that a short photograph, which rests with one edge just against a limb of a side piece perpendicular thereto, is still held by the opposite side piece on the other edge.

As mentioned above, the device has the viewing window in the upper shell of the housing. The dimension of the window is then at the most so great in the direction transverse to the direction of movement that the shortest possible photograph, even if it is lying off-center, does not present itself with its edge in the field of view. The same applies to the ribs 36, and just the same considerations apply to the spring arms 79 and 80 and especially to all components engaging with the sheet faces.

The construction of the spring system which is described above and illustrated, formed by the springs, cut in one piece and arranged symmetrically in pairs, with the spring arms 24 and 32, fulfils a total of five functions. Firstly, the hook-like members 22 moulded on them form the feeding means, the hook-like members finally taking along only one sheet into the separating means. Secondly, both arms together—or, more accurately, the four arms of the two springs—form a bias system with which the pile is neatly pressed against the window when the device is at rest. Thirdly, the arm 32, after it has been passed over by the separator, serves to convey the individual sheet to the housing top wall and there, fourthly, hold it firmly. Fifthly, and finally, the arms 32 are arranged close enough to the retentive coatings 26 to be able, as a result of their bias force, to displace or peel off from the retentive coating any individual sheet which might adhere to the latter owing to a static charge. It is to be noted that the arm 32 is so shaped and arranged that it can be passed over by the separator bar without any disturbance to smooth operation.

FIGS. 11 and 12 show an alternative form of the blocking means according to FIGS. 9 and 10. Of the frame parts, in each case only sections 12 and 14 lying opposite each other are indicated. In one of the frame parts, in this case the frame part 14, a jamming-action roller 108 is rotatable about a journal 106, which is, however, fitted eccentrically. The roller carries opposite its greatest radius a pin 110 over which there is engaged a leaf spring 112 attached to the frame part 14. During movement in the direction of the arrow in FIG. 11 the jamming-action roller can yield, but in the opposite direction it jams the two frame parts. When the frame parts are in the end positions the jamming-action roller meets in each case a recess 114 in the other frame part and can therefore, when the push/pull direction is reversed, pivot freely through approximately 90°, until the pin 110 rests against the spring 112 again.

The two blocking devices described above act in the manner of a free-wheel and they only switch over the direction of free-wheeling when the two frame parts are in the end positions relative to each other. It may happen, however, that a user would like to rectify a faulty operation, perhaps because a pile of photographic prints has shifted during insertion. It is then desirable to be able to displace the frame parts relative to each other in both directions without blocking, at least from certain positions. For this reason a different type of construction of the blocking device is provided in the preferred example of execution of FIGS. 13 and 14 described below.

In this example of execution, in which blocking means act only in the critical phases of the changeover cycle, in a bearing eye 116 on the outside of a side-piece 44 of the slider member 14 in the region of the separator bar 20, there is pivotally arranged about a journal 160, which extends at right angles to the longitudinal direction of the side-piece 44, a control pawl 162 which is guided by a control projection 164 along channels which are defined by guide rails 166 formed on the bottom shell 62, so that the control projection 164 has to follow the path marked by arrows in FIG. 14 during insertion and withdrawal. During the greater part of the changeover cycle the direction of movement may be reversed without hindrance, but not when the control projection 164 is in the channel section 168 during insertion, or in the channel section 170 during the withdrawal. In the first case, if it should be desired to pull the slider member out again shortly before its inner end position, the control projection would run onto the stop member 172; in the latter case if, therefore, the slider member is pushed in again shortly before reaching the outer end position the control projection hits either the stop member 174 or the stop edge 176. The journal 160 is seated in the bearing eye with a degree of friction such as to allow the control pawl to follow the guide bars without any noticeable hindrance, but not to allow it to swing freely.

This free-wheel-type device can, like the two described hereinbefore, in addition be arranged mirror-symmetrically also on the other side of the housing 12 between the housing and the slider member 14, in which case the two free-wheel-type devices operate synchronously. If desired manual de-activation of the free-wheel-type device(s) may be provided.

I claim:

1. Apparatus for the cyclic rearrangement of a pile of rectangular or square pictures, said apparatus comprising:
   a first and a second frame part which can be moved back and forth parallel to the principal plane of the pile of pictures held by said frame parts between a first end position and a second end position, each of said first and second frame parts having stop means, said stop means on said first frame part cooperating with said stop means on said second frame part to define said end positions;
   a separator bar arranged in the second frame part which defines a separating through-gap for a picture and a return through-gap for the picture;
   a retaining means in the first frame part for retaining a picture taken from one end of the pile and guided through said separating through-gap;
   a guide means for shifting the retained picture transversely to the pile and returning it through the return through-gap to the other end of the pile;
   a viewing window in one of the frame parts; wherein the two frame parts are coupled by way of a free-wheel-type device which, when the two frame parts are in the first end position, frees return movement toward the second end position and, when they are in the second end position, frees withdrawal movement toward the first end position, but prevents a change in the direction of movement at least adjacent the first and second end positions.

2. Apparatus according to claim 1, wherein the free-wheel-type device is arranged in an area between two adjacent walls of the two frame parts.

3. Apparatus according to claim 1 or 2, wherein the free-wheel-type device comprises a toothed rack on a frame part, which toothed rack meshes with a pinion mounted in the other frame part, which pinion is displaceably mounted in a slot extending in the direction of movement of the frame parts, wherein the pinion, on movement of the frame parts in an admissible direction, is displaced by friction to one end of the slot, and on movement of the frame parts in an inadmissible direction, is displaced to the other end of the slot where it comes into locking engagement with a locking lug, while in each case a stop for the reversal in direction of rotation of the pinion is provided at the end positions of the two frame parts.

4. Apparatus according to claim 3, wherein the pinion is biased by means of a spring against the other part, the spring being supported against a wall of one frame part.

5. Apparatus according to claim 4, wherein the spring is integrally formed with the pinion as a curved leaf spring extending over the diameter of the pinion.

6. Apparatus according to claim 2, wherein the free-wheel-type device is mounted on one of the walls and has two possible directions of action as regards the opposing wall, the directions of action being reversible in the end positions of the frame parts.

7. Apparatus according to claim 6, wherein the free-wheel-type device comprises an eccentric roller mounted on the wall of one frame part which is held by bias in a blocking position.

8. Apparatus according to claim 7, wherein the eccentric roller has a pin opposite its greatest radius, which pin is in engagement with a spring secured on the other frame part, while there are provided in the end positions recesses into which the roller can release itself.

9. Apparatus according to claim 1 or 2, wherein a control projection is pivotably mounted on a frame part, which projection is guided in a channel of the other frame part which, in the region of the two end positions of the second frame part, has path diversion means with stop members which prevent a reversal of the direction of movement in the region of the path diversion means.

10. Apparatus according to claim 1, wherein there are provided on both sides of a central plane extending in a withdrawal direction, perpendicular to the principal plane, mirror-symmetrical, synchronously operating free-wheel-type devices.

11. Apparatus according to claim 1, wherein the free-wheel-type device can be deactivated manually.

12. Apparatus according to claim 1 further comprising a rotation-preventing means for securing said retained picture against rotation about an axis perpendicular to its principal plane.

13. Apparatus according to claim 1 wherein said retaining means comprises first and second retaining elements, said first retaining element holding said retained picture adjacent said second end position, said second retaining element holding said retained picture adjacent said first end position, and both of said first and second retaining elements holding said retained picture between said end positions.

14. Apparatus for the cyclic rearrangement of a pile of rectangular or square pictures by removing a picture from one end of said pile and returning it to an opposite end of said pile, said apparatus having a first and a second frame part which can be moved back and forth, parallel to the principal plane of the pile of pictures held by said frame parts between a first end position and a second end position, each of said first and second frame parts having stop means, said stop means of said first frame part cooperating with said stop means on said second frame part to define said end positions, wherein the two frame parts are coupled by a free-wheel-type device which, at least over some regions of the movement of the frame parts, prevents a change in direction of movement.

15. Apparatus according to claim 14 in which when the frame parts are in the first end position the free-wheel-type device frees movement toward the second end position and, when the frame parts are in the second end position, frees movement toward the first end position, but prevents any change in the direction of movement from occurring between the two end positions.

16. Apparatus according to claim 14 in which the free-wheel-type device, when the frame parts are in the first end position, frees movement toward the second end position and, when the frame parts are in the second end position, frees movement toward the first end position, but prevents a change in the direction of movement at least in the two regions of reversal before the second and first end positions are reached.

17. Apparatus according to claim 14 further having a separator bar arranged in one of the frame parts, which bar defines a separating through-gap for a picture and a return through-gap for the picture, wherein when the frame parts are being moved from the second end position to the first end position the free-wheel-type device prevents a change in direction of movement of the frame parts at least over the region in which the rear edge, in the direction of movement of the one frame part, of the separated picture is passing through the separating through-gap.

18. Apparatus according to claim 12 further having a separator bar arranged in one of the frame parts, which separator bar defines a separating through-gap for a picture and a return through-gap for the picture, wherein when the frame parts are being moved from the first end position to the second end position the free-wheel-type device prevents a change in direction of movement of the frame parts at least over the region in which the rear edge, in the direction of movement of the other frame part, of the separated picture is passing through the return through-gap.

19. Apparatus for the cyclic rearrangement of a pile of substantially rectangular sheets by removing a sheet from one end of said pile and returning it to an opposite end of said pile, said apparatus comprising:
- a first frame part and a second frame part for receiving said pile of sheets, said second frame part being movable relative to said first frame part along a displacement path parallel to the principal plane of the pile of sheets held by said frame parts from a first end position to a second end position, each of said first and second frame parts having stop means, said stop means on said first frame part cooperating with said stop means on said second frame part to define said end positions; and
- means coupling said first and second frame parts for, when said second frame part is being moved in a direction of motion along said displacement path from one of said first and second end positions to the other of said first and second end positions, preventing reversal of the direction of motion of said second frame part at least in one portion of said displacement path.

20. Apparatus according to claim 19 wherein said reversal preventing means is a free-wheel-type device.

21. Apparatus according to claim 19 further comprising:
- a separator bar arranged in the second frame part which defines a separating through-gap for a picture and a return through-gap for the picture;
- a retaining means in the first frame part for retaining a picture taken from one end of the pile and guided through said separating through-gap;
- a guide means for shifting the retained picture transversely to the pile and returning it through the return through-gap to the other end of the pile; and
- a viewing window in one of the frame parts.

22. Apparatus according to claim 20, wherein the free-wheel-type device is arranged in an area between two adjacent walls of the two frame parts.

23. Apparatus according to claim 19 wherein:
- the free-wheel-type device comprises a toothed rack on said first frame part, which toothed rack meshes with a pinion mounted on the second frame part, which pinion is displaceably mounted in a slot extending in the direction of movement of the frame parts, wherein the pinion, on the movement of the frame parts in an admissible direction, is displaced by friction to one end of the slot, and on movement of the frame parts in an inadmissible direction, is displaced to the other end of the slot where it comes into locking engagement with a locking lug; and
- a stop for the reversal in direction of rotation of the pinion is provided at each of said first and second end positions on one of the two frame parts.

24. Apparatus according to claim 23, wherein the pinion is biased against the second frame part by means of a spring, the spring being supported against a wall of the first frame part.

25. Apparatus according to claim 24, wherein the spring is integrally formed with the pinion as a curved leaf spring extending over the diameter of the pinion.

26. Apparatus according to claim 22, wherein the free-wheel-type device is mounted on one of the walls and has two possible directions of action as regards the opposing wall, the directions of action being reversible at the end positions of the frame parts.

27. Apparatus according to claim 26, wherein the free-wheel-type device comprises an eccentric roller which is held by bias in a blocking position.

28. Apparatus according to claim 27, wherein:
- the eccentric roller has a pin opposite its greatest radius, which pin is in engagement with a spring secured on the other frame part; and
- there are provided in the first and second end positions recesses into which the roller can release itself.

29. Apparatus according to claim 19 wherein a control projection is pivotably mounted on a frame part, which projection is guided in a channel of the other frame part which, in the region of the first and second end positions of the frame parts, has path diversion means with stop members which prevent a reversal of the direction of motion of the second frame part in the region of the path diversion means.

30. Apparatus according to claim 20 wherein there are provided on both sides of a central plane extending in the direction of said displacement path, perpendicular to a principal plane of said pile, mirror-symmetrical, synchronously operating free-wheel-type devices.

31. Apparatus according to claim 20 wherein the free-wheel-type device can be deactivated manually.

* * * * *